(12) United States Patent
Shonk et al.

(10) Patent No.: US 12,455,570 B2
(45) Date of Patent: Oct. 28, 2025

(54) SYSTEMS AND METHODS FOR HAY AND FORAGE WORKFLOW MAPPING

(71) Applicant: CNH Industrial America LLC, New Holland, PA (US)

(72) Inventors: Jason Shonk, New Holland, PA (US); Nathan Drzal, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 299 days.

(21) Appl. No.: 18/143,490

(22) Filed: May 4, 2023

(65) Prior Publication Data

US 2024/0370019 A1    Nov. 7, 2024

(51) Int. Cl.
   *G05D 1/00* (2024.01)

(52) U.S. Cl.
   CPC ......... *G05D 1/0212* (2013.01); *G05D 1/0094* (2013.01)

(58) Field of Classification Search
   CPC .. G05D 1/0212; G05D 1/0094; A01B 69/008; A01D 34/006; A01D 80/00; A01F 15/08
   See application file for complete search history.

(56) References Cited

U.S. PATENT DOCUMENTS

| | | | |
|---|---|---|---|
| 9,791,863 | B2 | 10/2017 | Derscheid et al. |
| 2021/0195827 | A1 | 7/2021 | Zhou |
| 2022/0201921 | A1 | 6/2022 | Sasamoto et al. |
| 2022/0207622 | A1 | 6/2022 | Hamilton |
| 2022/0210975 | A1 | 7/2022 | Digman |
| 2023/0142286 | A1* | 5/2023 | Morris ................. A01D 41/127 701/50 |
| 2024/0057503 | A1* | 2/2024 | Töniges ............... A01B 69/001 |

* cited by examiner

*Primary Examiner* — Anne Marie Antonucci
*Assistant Examiner* — Wesam Nmn Almadhrhi
(74) *Attorney, Agent, or Firm* — Foley & Lardner LLP

(57) ABSTRACT

Systems and methods disclosed provide for hay and forage workflow mapping. The system includes an agricultural vehicle, a sensor array, and a control system communicatively coupled to the agricultural vehicle. The sensor array includes one or more sensors that collect cutting data corresponding to a crop cutting operation, raking data corresponding to a crop raking operation, and gathering data corresponding to a crop gathering operation. The control system includes processing circuitry. The system receives the cutting data and generates a cutting map therefrom. Using the cutting map, the system generates a proposed raking path for the crop raking operation. The system also receives the raking data and generates a raking map therefrom. Using the raking map, the system generates a proposed gathering path for the crop gathering operation. Additionally, the system receives the gathering data and generates a gathering map therefrom. Successive proposed paths are generated from previously generated mappings.

20 Claims, 7 Drawing Sheets

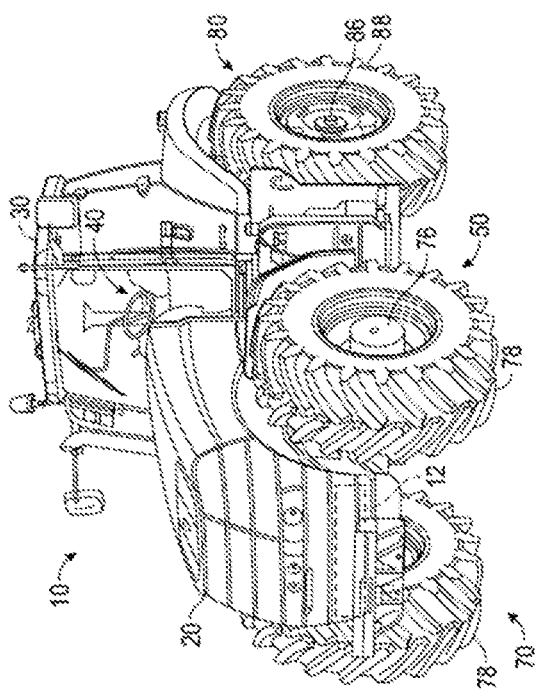
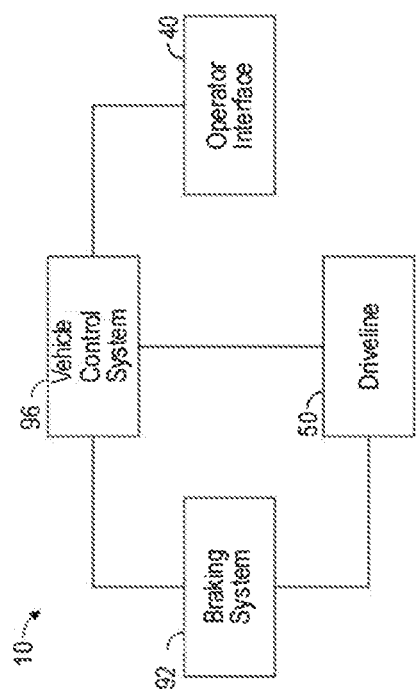
FIG. 1
FIG. 2

SYSTEMS AND METHODS FOR HAY AND FORAGE WORKFLOW MAPPING

BACKGROUND

The present disclosure relates generally to systems and methods for managing the workflow of successive hay, forage, and crop gathering operations. More specifically, the present disclosure relates to collecting workflow data during multiple operations on the same field, using that workflow data to generate proposed pathways for future operations on the field, and improving the proposed pathways for successive operations based on the earlier collected workflow data.

SUMMARY

One embodiment relates to a system for hay and forage workflow mapping. The system includes an agricultural vehicle, a sensor array communicatively coupled to the agricultural vehicle, and a control system communicatively coupled to the agricultural vehicle. The sensor array includes one or more sensors that collect cutting data corresponding to a crop cutting operation, raking data corresponding to a crop raking operation, and gathering data corresponding to a crop gathering operation. The control system includes processing circuitry. The processing circuitry receives the cutting data and generates a cutting map from the cutting data. Using the cutting map, the processing circuitry generates a proposed raking path for the crop raking operation. The processing circuitry then receives the raking data and generates a raking map from the raking data. Using the raking map, the processing circuitry generates a proposed gathering path for the crop gathering operation. Additionally, the processing circuitry receives the gathering data corresponding to the crop gathering operation and generates a gathering map from the gathering data.

In some embodiments, the agricultural vehicle includes an operator interface and at least one of the cutting map, raking map, or gathering map includes GPS directional data configured to be displayed on the operator interface. In other embodiments, the cutting data includes a field boundary, a swath position, a swath size, a swath cutting direction, an indication of an agricultural vehicle power, an indication of an agricultural vehicle speed, topographical data, or a date/time data. In further embodiments the raking data includes a raking direction or stem direction. In some aspects, the gathering data includes a plurality of actual bale locations corresponding to a baling operation or a plurality of actual forage wagon exchange points corresponding to a foraging operation.

In additional embodiments, the proposed raking path includes GPS directional data indicating a shortest travel path configured to be displayed on the operator interface. The shortest travel path may be based on a cutting direction of the crop.

In further embodiments, the proposed gathering path includes GPS directional data indicating a proposed bale location for a loading operation and/or indicating a proposed forage wagon exchange point for a foraging operation.

In other embodiments, the system also includes a database communicatively coupled to the control system. Additionally, the control system stores the cutting data, cutting map, proposed raking path, raking data, raking map, proposed gathering path, gathering data, and gathering map in the database. In some aspects, the system uses the cutting data, cutting map, proposed raking path, raking data, raking map, proposed gathering path, gathering data, and gathering map, to generate a proposed path for at least one of a successive cutting operation, a successive raking operation, a successive gathering operation, a successive loading operation, or a successive foraging operation.

Another embodiment relates to a control system for hay and forage workflow mapping. The control system includes processing circuitry configured to receive cutting data corresponding to a crop cutting operation and generate a cutting map from the cutting data. The processing circuitry also uses the cutting map to generate a proposed raking path for a crop raking operation. The processing circuitry receives raking data corresponding to the crop raking operation and generates a raking map from the raking data. The processing circuitry also uses the raking map to generate a proposed gathering path for a crop gathering operation. Additionally, the processing circuitry receives gathering data corresponding to the crop gathering operation and generates a gathering map from the gathering data.

Still further embodiments relate to a method for hay and forage workflow mapping. The method includes receiving cutting data corresponding to a crop cutting operation, generating a cutting map from the cutting data, generating, via the cutting map, a proposed raking path for a crop raking operation, receiving raking data corresponding to the crop raking operation, generating a raking map from the raking data, generating, via the raking map, a proposed gathering path for a crop gathering operation, receiving gathering data corresponding to the crop gathering operation, and generating a gathering map from the gathering data.

In further embodiments, the method also includes the step of storing the cutting data, cutting map, proposed raking path, raking data, raking map, proposed gathering path, gathering data, and gathering map in a database. In some aspects, the method includes using at least one of the cutting data, cutting map, proposed raking path, raking data, raking map, proposed gathering path, gathering data, or gathering map to generate a proposed path for at least one of a successive cutting operation, a successive raking operation, a successive gathering operation, a successive loading operation, or a successive foraging operation.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 1 is a perspective view of a vehicle, according to an exemplary embodiment.

FIG. 2 is a schematic block diagram of the vehicle of FIG. 1, according to an exemplary embodiment.

DETAILED DESCRIPTION

Figure 3:
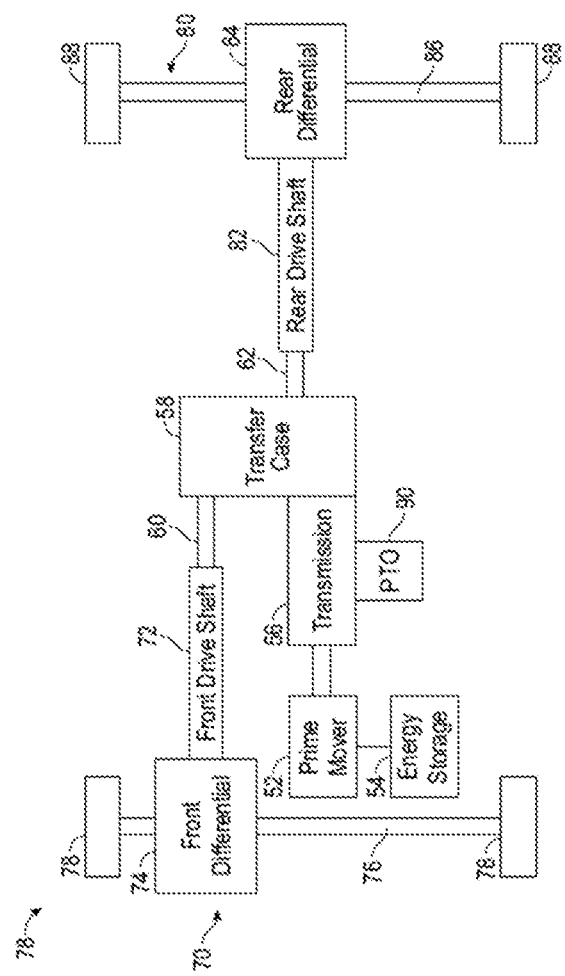
FIG. 3 is a schematic block diagram of a driveline of the vehicle of FIG. 1, according to an exemplary embodiment.

The hay and forage workflow cycle involves several process steps from cutting a crop to final processing. For example, one or more agricultural vehicles and corresponding implements are used to cut the crop, rake the crop to expedite drying, and either gather the crop into bales or collect the crop via forage wagons for forage/storage. Notably, the hay and forage workflow cycle often occurs multiple times a year over the same geographic area. Accordingly, the present disclosure relates to linking the multiple independent operations in the hay and forage workflow cycle by collecting data from each and using the collected data to inform downstream/successive operations.

For example, upon a first cutting of a crop, a control system creates a cutting map of a field and collects data associated with the cutting operation. The data may include the field boundaries, swath position, swath size, swath cutting direction, vehicle power, operational speed, topographical information, and time/date information. The cutting map and cutting data can be analyzed to provide useful information to a successive raking operation occurring on the previously cut field. The cutting data and cutting map may be communicated to a vehicle performing the raking operation, and an optimized or proposed raking path can be pre-planned based on the cutting data and cutting map. For example, the raking operation may consider the cutting direction to develop a most efficient path for raking the field and/or the swaths left behind by the cutting operation. In this way, data collected by independent vehicles, operators, and operations may be aggregated, analyzed, and converted into proposed pathing to inform separate and/or successive vehicles, operators, and operations.

When the raking operation occurs, raking data may be collected and used to generate a raking map. The raking map may be compared to the proposed raking path, and inconsistencies can be reconciled to determine if the proposed raking path should be corrected or revised. The control system may revise proposed paths (e.g., make changes compared to previous proposed paths) upon determining that a change may decrease operation time, fuel usage, etc. In a similar manner, raking data and the raking map may be used to generate a proposed path for subsequent gathering operations taking place on the same field. The previously collected information saves time and increases operator efficiency by using the data from previous operations to pre-plan a proposed path for the gathering operation such as a baling operation or a foraging operation. For example, the raking data and/or raking map may indicate a raking direction or stem direction, and thus may direct the gathering operation along a path that ensures a maximum amount of the crop is loaded stem first into the gathering vehicle (e.g., agricultural vehicle baling hay, forage wagon, etc.). Using the collected data and mapping of the field, the proposed path for the gathering operation may also pre-plan the gathering path to calculate efficient or optimized field bale locations for a successive loading operation. For example, the raking direction and windrow size may be used to estimate a gathering path that results in bale locations spaced such that loading of the bales requires traveling a minimal distance, results in a loading path that avoids obstacles, etc.

Similarly, the gathering path may use previously collected data (e.g., swath size, cutting direction, tractor power, operational speed, forage wagon capacity, etc.) to pre-plan a route that sets forage wagon exchange points in preferred positions. These positions could include exchange points that require the least distance traveled by the forage wagons or points that result in a forage operation requiring minimal time to complete.

The systems and methods disclosed herein may be developed over successive hay and forage workflow cycles occurring on the same field. In other words, data, maps, and proposed paths generated during a first cycle may be used for a second, third, fifth, etc. cycle on the same field. Changes occurring over seasons, changes in topography, operator deviations made from proposed paths, and the like can be stored in a database, and used to generate improved or updated proposed pathing for future hay and forage operations on the same field. The systems and methods disclosed herein may be utilized by a single agricultural vehicle carrying out the various operations by switching implements/attachments. Alternatively, systems and methods disclosed herein may be carried out by one or more independent agricultural vehicles (e.g., a fleet) each carrying out a designated workflow operation (e.g., a mower for cutting, a forage wagon for gathering, etc.).

Overall Vehicle

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as vehicle control system 96, coupled to the operator interface 40, the driveline 50, and the braking system 92. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 52) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Control System for Hay and Forage Workflow Mapping

Figure 4:
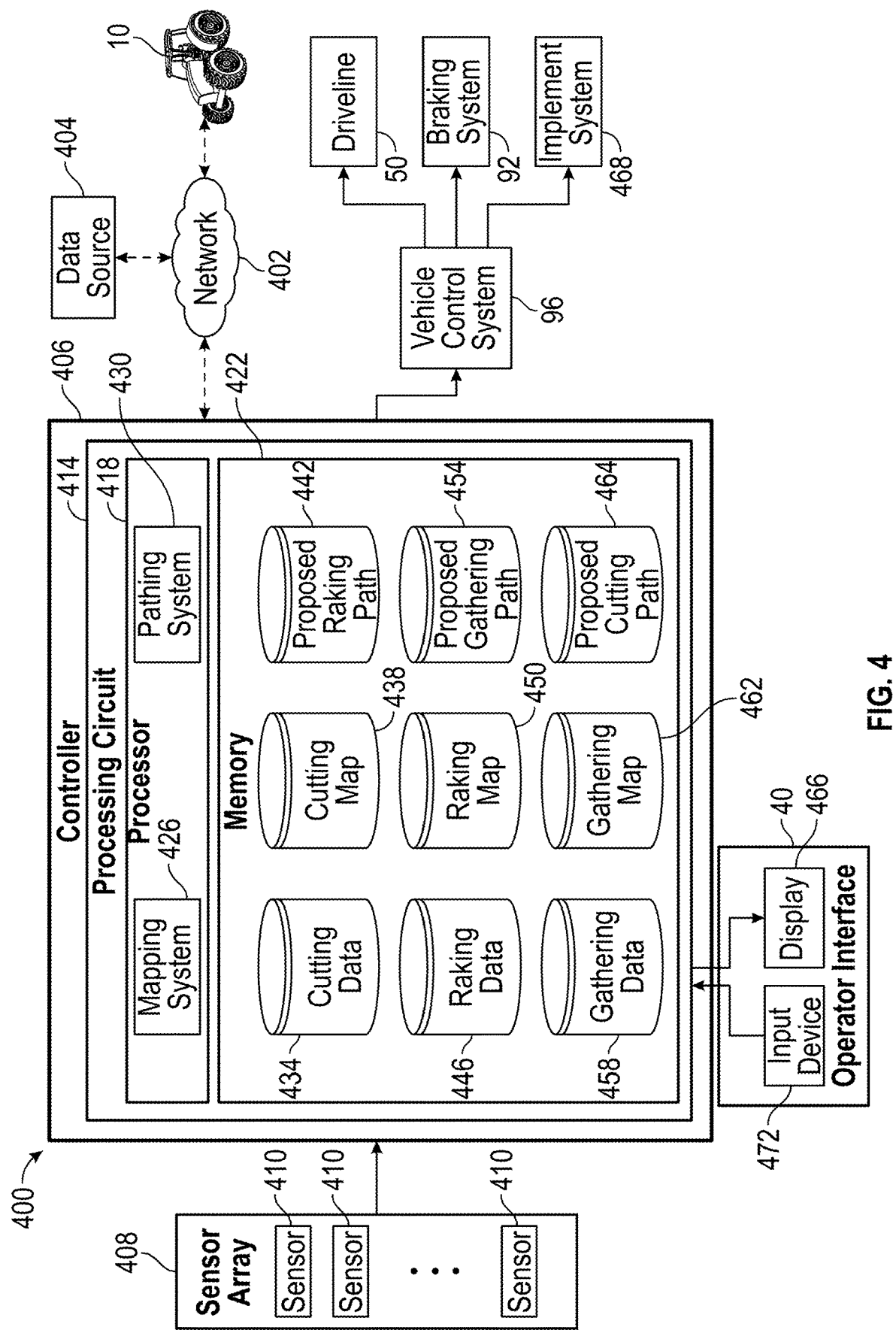
FIG. 4 is a control system for hay and forage workflow mapping, according to an exemplary embodiment.

Turning to FIG. 4, a control system 400 for hay and forage workflow mapping is shown. The control system 400 may be a stand-alone control system or may be integrated with the vehicle control system 96 of one or more agricultural vehicles 10. In other embodiments, the control system 400 is a control system hosted fully or partially on a network 402 and/or a data source 404 (e.g., a remote data source, a server, a database, a mobile device, a computer system, etc.).

The control system 400 for hay and forage workflow mapping includes a controller 406. The controller 406 may be communicatively coupled to one or more of vehicles 10, an operator interface 40 of a vehicle 10, a vehicle control system 96, a network 402, a data source 404, or a sensor array 408 with one or more sensors 410. The controller 406 includes a processing circuit 414 with a processor 418 and a memory 422. The processor 418 includes a mapping system 426 and a pathing system 430, both of which receive input data from the memory 422 and are configured to output data to the memory 422, as explained herein.

The memory 422 is configured to store hay and forage data for use by the control system 400 for hay and forage workflow mapping. In some embodiments, the hay and forage data is stored as cutting data 434, cutting maps 438, proposed raking paths 442, raking data 446, raking maps 450, proposed gathering paths 454, gathering data 458, gathering maps 462, and/or proposed cutting paths 466. In other embodiments, hay and forage data includes locations of bales, forage wagon exchange points, variations in workflow pathing, etc. In other embodiments, data associated with a cutting operation, raking operation, and gathering operation may be stored in respective buckets, in one database, separately in multiple databases (e.g., cutting data stored on a vehicle 10 configured to mow a crop, raking data stored on a vehicle 10 configured to rake a crop, etc.). The control system 400 for hay and forage workflow mapping uses the data on the memory 422 to perform the steps of the methods disclosed herein and to provide for improved and optimized operations in the haymaking and forage process.

For example, the hay and forage process may begin with a crop cutting operation. Crop cutting operations may be operations such as mower-conditioners, disc mowers, or other agricultural vehicles 10 cutting various grasses and legumes (e.g., alfalfa, clover, ryegrass, etc.) grown in a field. During the crop cutting operation, the control system 400 for hay and forage workflow mapping is configured to collect the cutting data 434. Cutting data 434 may include the location of a field boundary surrounding the crop (e.g., a fence, a boarder, a headland, a barrier, a road, an obstacle, etc.). Other examples of crop cutting data 434 include a swath position, a swath size, and a swath cutting direction. As the cutting vehicle (e.g., mower) cuts the crop, swaths of cut crop are left in the field to dry over a period of time (e.g., days). Cutting data 434 associated with the location, size, and cutting direction of the swaths is collected and used to improve successive operations in the haymaking or forage process (e.g., a raking operation, a gathering operation, a loading operation, etc.). Cutting data 434 such as the location of field boundaries, obstacles, boarders, the size, position, and cutting direction of swaths, etc. may be stored as GPS directional data, coordinate data, latitude and longitude pairings, GNSS data, or in other suitable formats. Additionally, cutting data 434 may include indications of the power output of the vehicle 10 (e.g., the mower) or vehicle speed at various locations. Such data may be stored as a vector, list, as a dataset associated with a position of the field, etc. Vehicle power and speed data may be monitored to identify pathing that utilizes less vehicle power usage, faster speeds of operation, areas of the field that require more vehicle power to navigate, etc. Cutting data 434 may also include indications of topographical data (e.g., elevations or depressions in the field, locations of pivot tracks, etc.) or date/time markers (e.g., a log of the vehicle 10 location at a specific hour/minute/second and date, a total travel time, a time to complete an operation, etc.).

The cutting data 434 may be collected by sensor array 408, which may include one or more sensors 410. The sensors 410 may be independent sensors (e.g., stand-alone sensors placed in the field year-round and communicatively coupled to the control system 400, sensors mounted to a pivot tower, etc.). The sensors 410 may also be coupled to, integral with, or otherwise located on the agricultural vehicle 10. For example, sensors 410 may be mounted to an implement system 468 of one or more vehicles 10 (e.g., a sensor mounted to the header of a windrower or swather and configured to detect a geographic position, a speed, an elevation, etc. of the header/windrower). In other embodiments, sensors 410 may include speed or position sensors coupled to the driveline 50 or braking system 96 of the vehicle 10. Sensors 410 may further include integrated sensors with the driveline 50 (e.g., sensors for engine fuel input, mass flow input, etc.) to determine a power usage of the vehicle 10 during the cutting operation. In some embodiments, the sensors 410 include GPS systems, light detection and ranging (LiDAR), optical sensors, ultrasonic sensors, etc. for collecting cutting data 434 such as field boundary positions, swath position/size/location, cutting direction, etc. In some embodiments, cutting data 434 may be received at the operator interface 40 via an input device 472. For example, an operator may input the date/time of a cutting operation, type of crop cut, location of field boundaries, etc. In other embodiments, the input device 472 may include a GPS unit and the control system 400 may receive cutting data from the input device (e.g., determine field boundaries from GPS data).

Once collected, the cutting data 434 may be received by the mapping system 426. Exemplary mapping systems 426 include but are not limited to GPS mapping systems, GNSS systems, satellite mapping systems, route determining algorithms, 2D/3D modeling systems, etc. The mapping system 426 may generate a cutting map 438 (e.g., 2D model, 3D model, coordinate set, virtual model, instruction set, GPS map, etc.) that represents the cutting operation, the actual path taken during the cutting operation, the cutting data 434, etc. The cutting map 438 may include diversions taken from a pre-defined cutting path or from a proposed cutting path 464.

The control system 400 for hay and forage workflow mapping may utilize the cutting map 438 as an input to the pathing system 430 of the processor 418. The pathing system 430 receives the cutting map 438 and/or the cutting data 434 in order to generate a proposed raking path 442 for a crop raking operation. The crop raking operation may include the use of wheel rakes, rotary rakes, etc. that rake the swaths of cut crop into windrows. The windrows may be of varying width and density (e.g., wider, flatter windrows in hot/dry climates; taller, less dense windrows in cold/wet climates, etc.). In some embodiments, the proposed raking path 442 utilizes the cutting data 434 and/or the cutting map 438 generated from the cutting operation to predict an improved or efficient pathing for the raking operation that occurs subsequently to the previous cutting operation on the same field. For example, the proposed raking path 442 may differ from the actual cutting path (e.g., the path taken by the mower) to avoid repeating a long stretch of pathing that consumed large amounts of vehicle power at low vehicle speed. The pathing system 430, for example, may calculate an alternative route given the cutting data 434 and cutting map 438 (e.g., a path that follows the swaths but avoids an obstacle or large change in elevation encountered by the mower). In other embodiments, the proposed raking path 442 may consider the cutting direction of the crop from the cutting operation and maximize raking to bias the travel direction for a subsequent gathering operation (e.g., the proposed raking path 442 is configured to align the crop/stems in the same direction for the maximum length of pathing in order to provide for efficient stem-first feeding into a baler, etc.). In some embodiments, the proposed raking path 442 is the shortest path or a path with the fastest associated travel time that a vehicle 10 may take to rake the swaths on the field, given the geometry/physical boundaries of the field and swath position.

Once generated, the proposed raking path 442 may be received by an operator of a vehicle 10 configured to rake the field. For example, the proposed raking path 442 may be uploaded to the GPS system, autoguidance system, or operator interface 40 of a vehicle 10. In other embodiments, the proposed raking path 442 may be received at the data source 404 (e.g., a mobile phone, a user device, a web application, guidance software, etc.). An operator can then follow or utilize the proposed raking path 442 when performing a raking operation on the field.

During the raking operation, the control system 400 for hay and forage workflow mapping is configured to collect the raking data 446. Raking data 446 may include data similar to or overlapping with the cutting data 434 (e.g., collecting/updating the location of a field boundary surrounding the crop, date/time information, topographical data, vehicle speed/power information, etc.). Other examples of raking data 446 include a windrow position, a windrow size, and a stem direction. As the raking vehicle/implement (e.g., wheel rake, windrower, etc.) rakes the crop or shapes the crop into windrows, the crop may be positioned to an optimal height, density, and direction for drying. Specifically, stem direction and data indicating stem direction may be used to provide for more efficient gathering operations (e.g., data indicative of a stem direction may be collected so that a vehicle 10 subsequently gathering the crop/windrow can feed the crop stem-first, which results in more efficient gathering).

The raking data 446 may be collected by the sensor array 408 and/or one or more sensors 410. For example, sensors 410 may be mounted to an implement system 468 of one or more vehicles 10 (e.g., a sensor mounted to the header of a windrower or wheel rake and configured to detect the stem direction of the crop). In some embodiments, the sensors 410 include cameras, LiDAR, optical sensors, ultrasonic sensors, etc. and algorithms for analyzing patterns as the sensor passes over the hay stems to determine an average, prevailing, or general stem direction. In some embodiments, raking data 446 may be received at the operator interface 40 via an input device 472. For example, an operator may input the date/time of the raking operation. In other embodiments, the input device 472 may include the vehicle control system 96 (e.g., configurations/settings of a vehicle 10 for selecting a windrow size may be received from the vehicle 10 by the control system 400).

Once collected, the raking data 446 may be received by the mapping system 426. The mapping system 426 may generate a raking map 450 (e.g., 2D model, 3D model, coordinate set, virtual model, instruction set, GPS map, etc.)

that represents the raking operation, the actual path taken during the raking operation, the raking data 446, etc. The raking map 450 may include indications of diversions/variations in the route taken from the proposed raking path 442. For example, the raking map 450 may compare a time dataset estimated for the proposed raking path 442 with a time dataset collected from the actual raking path and determine that a portion of the raking operation was completed slower or faster than expected, used more/less power than expected, indicates a change in elevation of the field, indicates a loss of a section of the crop (e.g., the raking vehicle did not travel over a section of a field the mower previously cut), etc.

The control system 400 for hay and forage workflow mapping may utilize the raking map 450 as an input to the pathing system 430 of the processor 418. The pathing system 430 receives the raking map 450 and/or the raking data 446 in order to generate a proposed gathering path 454 for a crop gathering operation. The crop gathering operation may include a baling operation to form bales (e.g., round, square) from the crop. The crop gathering operation may also include a foraging operation utilizing a forage wagon to collect the crop, or other suitable operations for collecting the crop. In some embodiments, the proposed gathering path 454 utilizes the raking data 446 and/or the raking map 450 generated from the raking operation to predict an improved or efficient pathing for the gathering operation that occurs after the previous raking operation on the same field. For example, the proposed gathering path 454 may be generated to maximize the length of the route wherein the crop is fed stem-first into a baler. Further, the proposed gathering path 454 may be the shortest path or fastest path that a vehicle 10 may take to gather the bales, collect the crop, etc. given the geometry of the field, placement of the windrows, and capabilities of the vehicle 10. In other embodiments, the proposed gathering path 454 may consider changes between the cutting map 438 and raking map 450 (e.g., a loss of crop area, a change in elevation, a route requiring less fuel usage, etc.) to determine alternative gathering routes, each configured to optimize a certain criteria (e.g., a route requiring the least fuel use, a route to maximize gathered crop, a route to minimize dead heading, etc.).

In other embodiments, the pathing system 430 may calculate a route from the raking data 446 and raking map 450 to estimate or plan proposed bale locations for a successive crop loading operation. For example, the windrow density/size, length, vehicle storage capacity, and other raking and/or cutting data may be compared with estimated bale size/weight and used to generate a proposed gathering path 454 wherein bales are formed in a substantially linear arrangement. By arranging the bales in a linear arrangement, a vehicle 10 configured to load the bales may travel along a shorter path than if the bales were separated from each other or scattered around the field (e.g., not be required to traverse a winding path from bale to bale).

In other embodiments, the proposed gathering path 454 may consider the raking data 446 and/or raking map 450 in order to estimate or plan forage wagon exchange points. For example, the proposed gathering path may calculate a shortest distance between loading zones and prospective forage wagon exchange points. In other embodiments, the pathing system 430 may determine a location of a forest wagon exchange point that would provide for a proposed gathering path 454 with a fastest travel time relative to other gathering paths or previous gathering paths.

Once generated, the proposed gathering path 454 may be received by an operator of a vehicle 10 configured to gather the crop (e.g., an agricultural vehicle 10 equipped with a baler, forage wagon, etc.). For example, the proposed gathering path 454 may be uploaded to the GPS system, autoguidance system, or operator interface 40 of a vehicle 10. In other embodiments, the proposed gathering path 454 may be received at the data source 404 (e.g., a mobile phone, a user device, a web application, guidance software, etc.). An operator can then follow or utilize the proposed gathering path 454 when performing a gathering operation on the field.

During the gathering operation, the control system 400 for hay and forage workflow mapping is configured to collect the gathering data 458. Gathering data 458 may include data similar to or overlapping with the cutting data 434 and/or raking data 446 (e.g., collecting/updating the location of a field boundary surrounding the crop, date/time information, topographical data, vehicle speed/power information, etc.). Other examples of gathering data 458 include an actual bale location (e.g., a physical location on the field of a bale formed during the gathering operation). The actual bale location may be stored and compared to the proposed bale location, and the control system 400 may adjust or alter successive proposed gathering paths (e.g., adjust the pathing to result in a more linear bale placement). In other embodiments, gathering data may include an actual forage wagon exchange point location. The control system 400 may adjust successive proposed gathering paths by comparing the actual forage wagon exchange point with proposed forage wagon exchange points (e.g., provide an alternative forage wagon exchange point upon determining that a new location results in a faster/shorter gathering operation).

The gathering data 446 may be collected by the sensor array 408 and/or one or more sensors 410. For example, sensors 410 may be mounted to an implement system 468 of one or more vehicles 10 (e.g., a sensor mounted to the baler or forage wagon). In some embodiments, the sensors 410 include those used in the cutting and/or raking operation. In other embodiments, pressure sensors, load sensors, etc. attached to the vehicle 10 may determine the weight, size, or other qualities of the gathered crop. In further embodiments, sensors 410 on pivot towers, posts, etc. may identify the location of bales and store the same on a GPS system communicatively coupled to the control system 400.

Once collected, the gathering data 458 may be received by the mapping system 426. The mapping system 426 may generate a gathering map 462 (e.g., a 2D model, 3D model, coordinate set, virtual model, instruction set, GPS map, etc.) that represents the gathering operation, the actual path taken during the gathering operation, the gathering data 458, etc. The gathering map 462 may include indications of diversions/variations in the route taken from the proposed gathering path 454. For example, the gathering map 462 may compare the actual gathering path and the proposed gathering path 454, the proposed bale locations, and the actual bale locations to determine if adjustment to the proposed gathering path 454 is needed for better alignment of bales.

The control system 400 for hay and forage workflow mapping may utilize the gathering map 462 as an input to the pathing system 430 of the processor 418. The pathing system 430 receives the gathering map 462 and/or the gathering data 458 in order to generate a proposed cutting path 464 for a crop cutting operation. For example, the crop cutting operation may include a successive cutting operation to be performed on the same field in a future hay and forage cycle. In other embodiments, the control system 400 may store the cutting data 434, cutting map 438, proposed raking path 442, raking data 446, raking map 450, proposed gathering path 454, gathering data 458, gathering map 462, and proposed cutting path 464 in the data source 404 (e.g., a data base, a server, etc.). The control system 400 may access previously acquired (e.g., stored) cutting data 434, cutting maps 438, proposed raking paths 442, raking data 446, raking maps 450, proposed gathering paths 454, gathering data 458, gathering maps 462, and/or proposed cutting paths 464 to generate a proposed path for a successive hay and forage operation occurring on the same field.

In various embodiments, the cutting data 434, cutting maps 438, proposed raking paths 442, raking data 446, raking maps 450, proposed gathering paths 454, gathering data 458, gathering maps 462, and/or proposed cutting paths 464 are received on a display 466 of the operator interface 40. The display 466 may include a console, a touchscreen, a LCD display, a LED display, a GPS display, a screen, etc. coupled to a vehicle 10. In other embodiments, the display 466 may be a mobile device, user device, etc. (e.g., a mobile device directing an operator along a proposed gathering path 454, etc.).

Method of Hay and Forage Workflow Mapping

Figure 5:
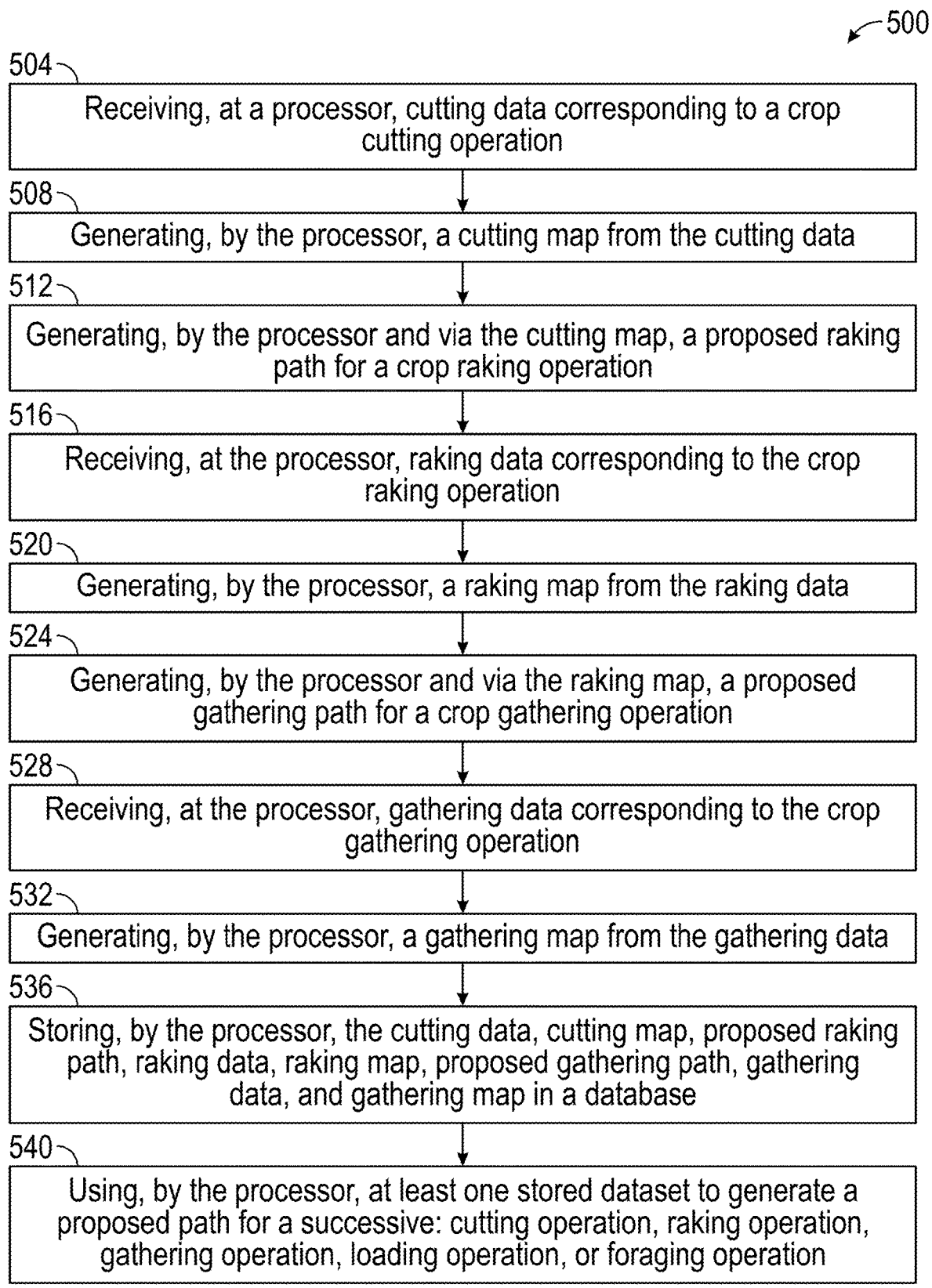
FIG. 5 is flow chart showing the steps of a method for hay and forage workflow mapping, accordingly to an exemplary embodiment.

Turning to FIG. 5, an exemplary method 500 for hay and forage workflow mapping is shown. In some embodiments, more or less steps are included in the method 500. In various embodiments, the steps may be performed out of order, non-consecutively, repeatedly, in variations of the shown order, etc.

Figure 6:
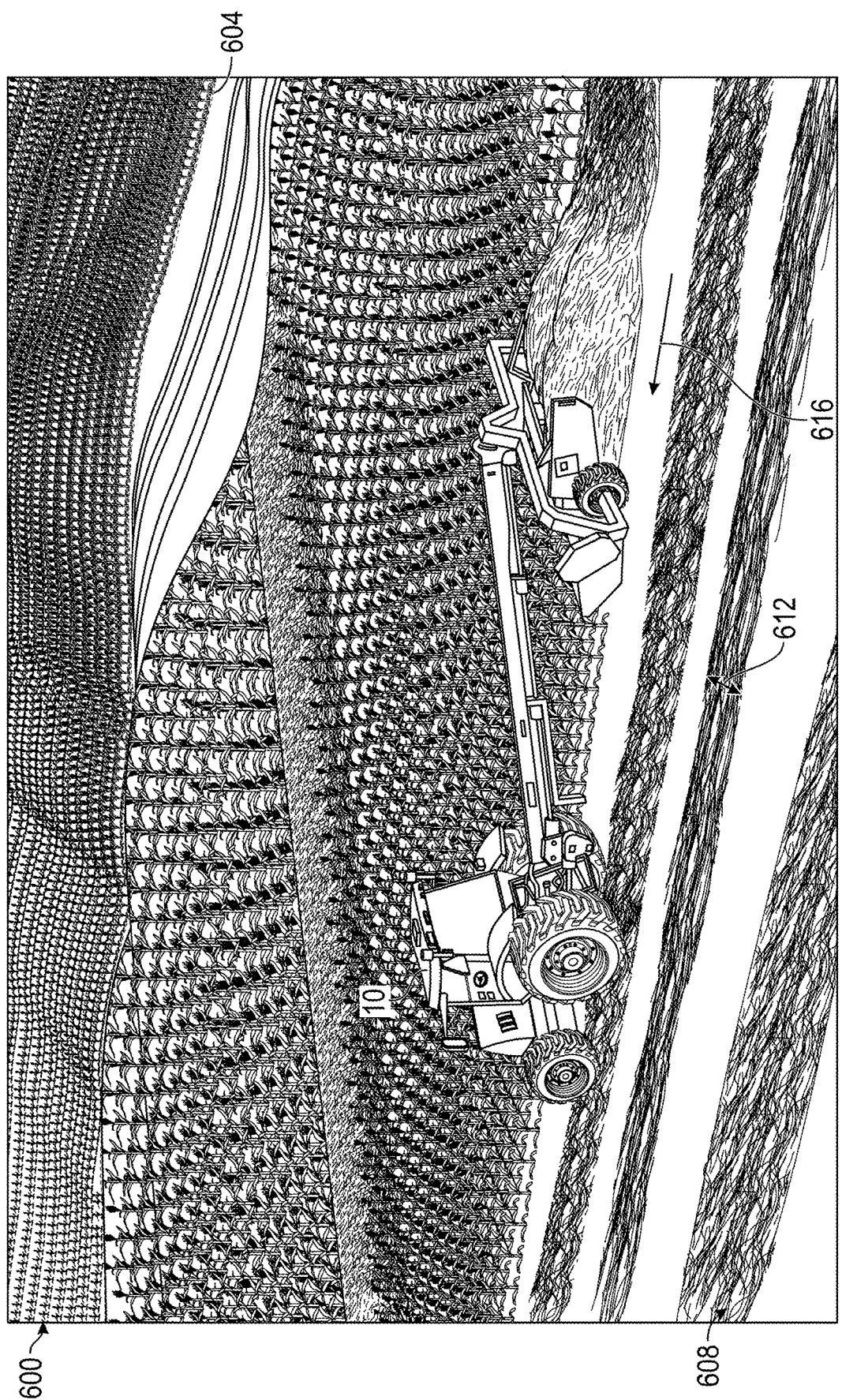
FIG. 6 is a perspective view of a vehicle performing a crop cutting operation, according to an exemplary embodiment, and illustrating exemplary cutting data.

At step 504, the method 500 includes receiving, at a processor, cutting data 434 corresponding to a crop cutting operation. For example, an exemplary cutting operation 600 is shown in FIG. 6 along with examples of various cutting data 434. As shown in FIG. 6, the cutting data 434 may include a field boundary 604, a swath position 608, a swath size 612, or a swath cutting direction 616. As the vehicle 10 travels along the field, the vehicle 10 cuts the crop into swaths. Sensor 410 may be mounted to the vehicle 10 (e.g., on the cutting implement, integral to the GPS system of the vehicle 10) to collect data corresponding to swath size, vehicle power, time, position, topography, vehicle speed, etc. Other sensors 410 may be located as independent sensors or may be only communicatively coupled to the vehicle 10 or control system 400. For example, sensors 410 such as GPS beacons, optical sensors, moisture sensors, etc. may be placed in the field to denote the field boundary 604, soil moisture content, etc.

At step 508, the method 500 includes generating, by the processor, a cutting map 438 from the cutting data 424. For example, an exemplary may include a GPS map (e.g., a directional GPS map of the field) displaying the field with overlays indicating swath placement, swath size, topography, the actual cutting route taken, etc. In other embodiments, the cutting map 438 may include models, datasets, etc. that correlate the cutting data 434 collected with the physical boundaries of the field. The cutting map 438 map be shown to the operator via the display 466, via the operator interface 40 of the vehicle 10, etc.

Figure 7:
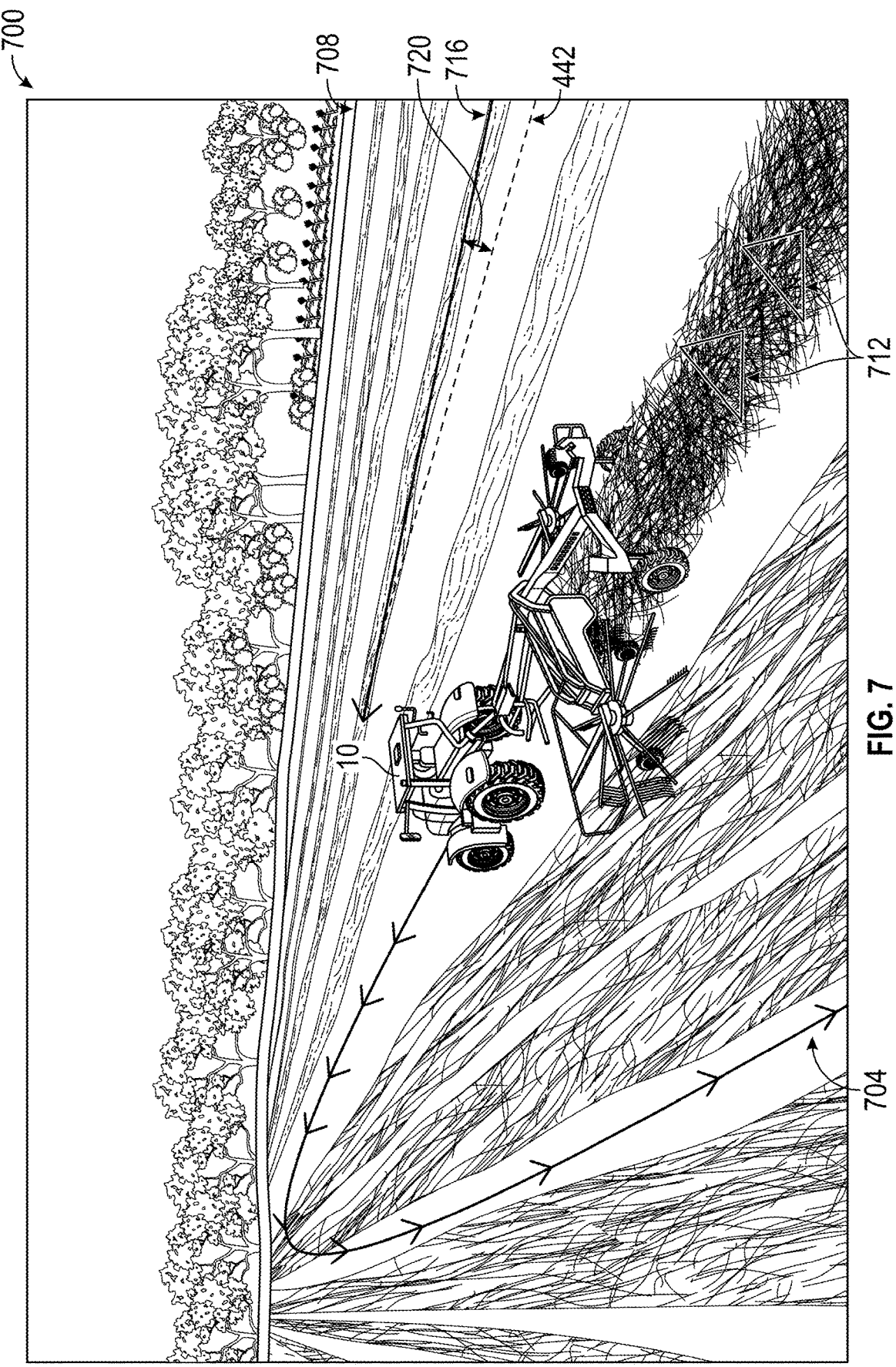
FIG. 7 is a perspective view of a vehicle performing a crop raking operation, according to an exemplary embodiment, and illustrating exemplary raking data.

At step 512, the method 500 includes generating, by the processor and via the cutting map 438, a proposed raking path 442 for a crop raking operation. As shown in FIG. 7, an operator carrying out an exemplary raking operation 700 may follow the proposed raking path 442 while raking the crop. In some embodiments, the proposed raking path 442 is a GPS directional map displayed to the operator via the operator interface 40 of the vehicle 10. In other embodiments, the proposed raking path 442 may be an instruction set given to an automated navigation system of the vehicle 10. In other embodiments, the proposed raking path 442 may be a route, satellite image with guidance overlays, etc.

received via the display 466 or at a data source 404. As shown in FIG. 7, the proposed raking path 442 may be a GPS directional path guiding the operator to follow a line/route/course 704 (e.g., GPS navigational data) while raking the crop. The proposed raking path 442 may indicate a shortest travel path (e.g., a shortest path based on a cutting direction, a path spaced such that each pass creates windrows spaced a maximum distance apart, etc.).

At step 516, the method 500 includes receiving, at the processor, raking data 446 corresponding to the crop raking operation (e.g., the exemplary raking operation 700). Exemplary raking data 446 collected are shown in FIG. 7. In some embodiments, raking data 446 may include similar data or update the data collected during the cutting operation. For example, raking data 446 may include new/updated/confirmed locations of field boundaries, shown as field boundary 708. Other raking data 446 may include a stem direction 712, which may indicate a direction from which a baler should approach the windrow to feed the crop stem-first into the implement of the vehicle 10. In some embodiments, raking data 446 includes the actual raking path 716 taken by the vehicle 10 and/or a variation 720 between the actual raking path 716 and the proposed raking path 442.

At step 520, the method 500 includes generating, by the processor, a raking map 450 from the raking data 446. Like the cutting map 438, the raking map 450 may include a GPS map (e.g., a directional GPS map of the field) displaying the field with overlays indicating windrow placement, windrow size, topography, the actual raking route taken, etc. In some embodiments, the raking map 450 may be an updated version of the cutting map 438 or may overwrite data on the cutting map 438.

Figure 8:
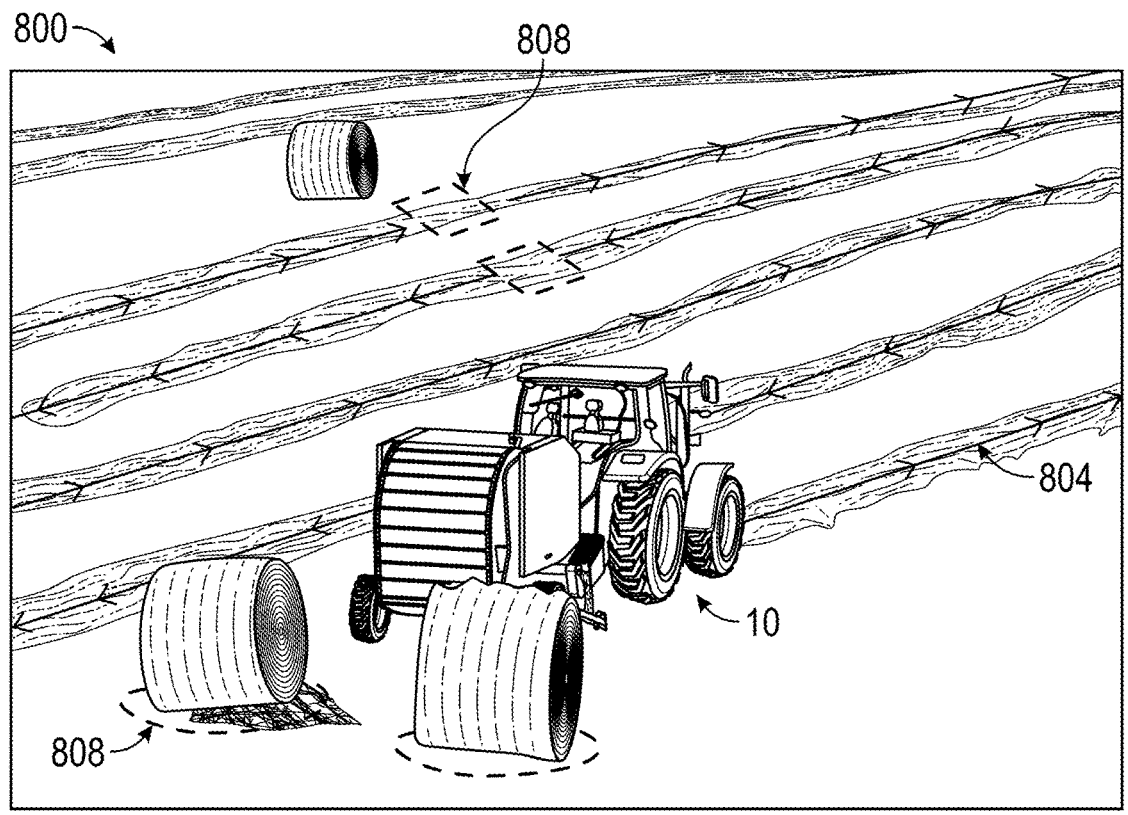
FIG. 8 is a perspective view of a vehicle performing a crop gathering operation, according to an exemplary embodiment, and illustrating exemplary gathering data.

At step 524, the method 500 includes generating, by the processor and via the raking map 450, a proposed gathering path 454 for a crop gathering operation. As shown in FIG. 8, an operator carrying out an exemplary gathering operation 800 may follow the proposed gathering path 454 while gathering (e.g., baling) the crop. In some embodiments, the proposed gathering path 454 is a GPS directional map displayed to the operator via the operator interface 40 of the vehicle 10. In other embodiments, the proposed gathering path 454 may include data similar to or containing identical features as the proposed cutting path 464 or proposed raking path 442. As shown in FIG. 8, the proposed gathering path 454 may be a GPS directional path guiding the operator to follow a line/route/course 804 (e.g., GPS navigational data) while gathering the crop. The proposed gathering path 454 may include one or more proposed bale locations 808 for a loading operation. For example, in FIG. 8, the processor 418 via the mapping system 426 and/or pathing system 430 may generate a proposed gathering path 454 with proposed bale locations 808 that are substantially linear, reducing the distance that a subsequent loading vehicle would need to travel to collect the bales.

Figure 9:
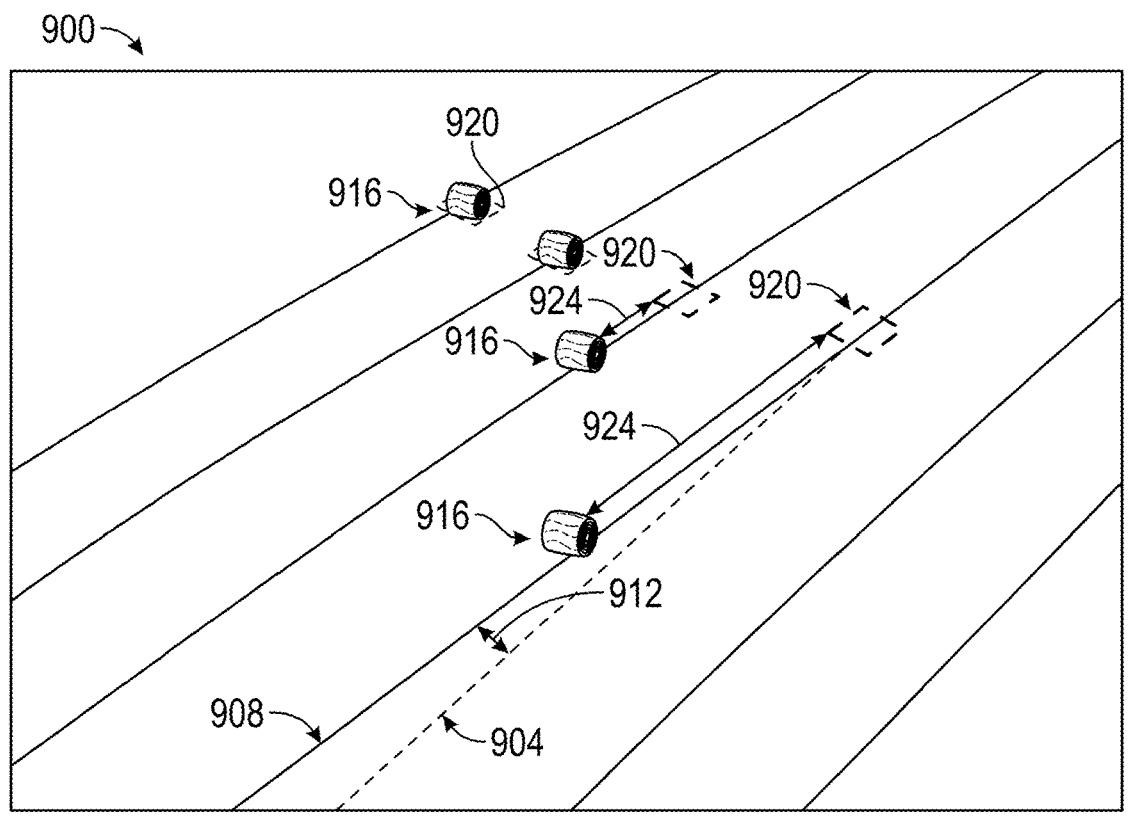
FIG. 9 is an illustration further showing exemplary gathering data.

At step 528, the method 500 includes receiving, at the processor, gathering data 458 corresponding to the crop gathering operation (e.g., the exemplary crop gathering operation 800). As discussed herein, gathering data 458 may include data overlapping or updating cutting/raking data. In other embodiments, gathering data 458 includes an actual bale location, the difference between an actual bale location and a proposed bale location, vehicle power information, crop yield, etc. At step 532, the method 500 includes generating, by the processor, a gathering map 462 from the gathering data 458. The crop gathering map 462 may display an actual gathering path taken by a vehicle 10 during a gathering operation, differences between the actual gathering path and a proposed gathering path 454, actual bale locations, differences between actual bale locations and proposed bale locations, etc. For example, FIG. 9 shows an illustration of gathering data as displayed on an exemplary crop gathering map 900. The exemplary crop gathering map 900 may include indications 904 (e.g., dotted lines, GPS data, markers indicating the proposed path) of the proposed gathering path 454. In other embodiments, the actual gathering path 908 is shown, and variations 912 between the proposed gathering path 454 and the actual gathering path 908 may be calculated, stored, applied to adjust successive proposed pathing, etc. Similarly, actual bale locations 916, proposed bale locations 920, and differences 924 between the actual bale locations 916 and proposed bale locations 920 may be shown and calculated for similar purposes.

At step 536, the method 500 includes storing, by the processor, the cutting data 434, cutting map 438, proposed raking path 442, raking data 446, raking map 450, proposed gathering path 454, gathering data 458, and gathering map 462 in a database (e.g., data source 404). By storing the hay and forage workflow data in the database, the control system 400 and method 500 may pull data from past hay and forage cycles on the same field in order to generate new, updated, or more efficient proposed paths.

For example, at step 540, the method 500 includes using, by the processor, at least one of the cutting data 434, cutting map 438, proposed raking path 442, raking data 446, raking map 450, proposed gathering path 454, gathering data 458, or gathering map 462 to generate a proposed path for at least one of a successive cutting operation, a successive raking operation, a successive gathering operation, a successive loading operation, or a successive foraging operation. For example, the gathering map 462 and gathering data 458 generated/collected at the end of a first hay and forage cycle may be used to generate an initial proposed cutting path 464 for the start of a successive hay and forage cycle. In some embodiments, the initial cutting path and map may lead to less yield than expected, higher fuel costs, slower operation times, etc. Accordingly, the control system 400 and method 500 may predict alternative proposed cutting paths 464, proposed raking paths 454, and proposed gathering paths 454 for the same field across multiple iterations of the hay and forage process to optimize operation time, operator efficiency, lower production costs, reduce ground compaction (e.g., require less distance traveled/minimizing driving in the field), etc. Successive iterations may include consecutive operations (e.g., back-to-back cycles), may include cycles following sometime after the initial cycle (e.g., cycle in month A of year XXXX used to adjust the proposed paths for cycle in month A of year YYYY), etc.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the vehicle control system 96, etc.) as shown in the various exemplary embodiments is illustrative only. Additionally, any element disclosed in one embodiment may be incorporated or utilized with any other embodiment disclosed herein.

What is claimed is:

1. A system for hay and forage workflow mapping, the system comprising:
   an agricultural vehicle;
   a sensor array communicatively coupled to the agricultural vehicle, the sensor array including one or more sensors configured to collect cutting data corresponding to a crop cutting operation of a crop, raking data corresponding to a crop raking operation of the crop, and gathering data corresponding to a crop gathering operation of the crop; and
   a control system communicatively coupled to the agricultural vehicle, the control system comprising processing circuitry configured to:
      receive the cutting data;
      generate a cutting map from the cutting data;
      generate, based at least in part on the cutting map, a proposed raking path for the crop raking operation;
      autonomously operate the agricultural vehicle along the proposed raking path;
      receive the raking data;
      generate, based at least in part on the raking data, a raking map;
      determine, based at least in part on the raking data, an average stem direction of the crop;
      generate, based at least in part on the raking map and the average stem direction of the crop, a proposed gathering path for the crop gathering operation such that a direction of travel of the proposed gathering path provides a stem-first gathering of the crop;
      receive the gathering data; and
      generate a gathering map from the gathering data.

2. The system of claim 1, wherein:
the agricultural vehicle includes an operator interface; and
at least one of the cutting map, raking map, or gathering map includes GPS directional data configured to be displayed on the operator interface.

3. The system of claim 1, wherein:
the cutting data includes at least one of a field boundary, a swath position, a swath size, a swath cutting direction, an indication of an agricultural vehicle power, an indication of an agricultural vehicle speed, topographical data, or a time marker;
the raking data includes a raking direction or a stem direction; and
the gathering data includes a plurality of actual bale locations corresponding to a baling operation or a plurality of actual forage wagon exchange points corresponding to a foraging operation.

4. The system of claim 1, wherein:
the agricultural vehicle includes an operator interface; and
the proposed raking path includes GPS directional data indicating a shortest travel path configured to be displayed on the operator interface, the shortest travel path based on a cutting direction.

5. The system of claim 1, wherein:
the agricultural vehicle includes an operator interface; and
the proposed gathering path includes GPS directional data, configured to be displayed on the operator interface, indicating a proposed bale location for a loading operation.

6. The system of claim 1, wherein:
the agricultural vehicle includes an operator interface; and
the proposed gathering path includes GPS directional data, configured to be displayed on the operator interface, indicating a proposed forage wagon exchange point for a foraging operation.

7. The system of claim 1, further comprising:
a database communicatively coupled to the control system; and
wherein the processing circuitry is further configured to:
   store the cutting data, cutting map, proposed raking path, raking data, raking map, proposed gathering path, gathering data, and gathering map in the database, and
   using the cutting data, cutting map, proposed raking path, raking data, raking map, proposed gathering path, gathering data, and gathering map, generate a proposed path for at least one of a successive cutting operation, a successive raking operation, a successive gathering operation, a successive loading operation, or a successive foraging operation.

8. A control system for hay and forage workflow mapping for a vehicle, the control system comprising processing circuitry configured to:
receive cutting data corresponding to a crop cutting operation of a crop;
generate a cutting map from the cutting data;
generate, based at least in part on the cutting map, a proposed raking path for a crop raking operation;
autonomously operate the vehicle along the proposed raking path;
receive raking data corresponding to the crop raking operation;
generate, based at least in part on the raking data, a raking map from;
determine, based at least in part on the raking data, an average stem direction of the crop;
generate, based at least in part on the raking map and the average stem direction of the crop, a proposed gathering path for a crop gathering operation such that a direction of travel of the proposed gathering path provides a stem-first gathering of the crop;
receive gathering data corresponding to the crop gathering operation; and
generate a gathering map from the gathering data.

9. The control system of claim 8, wherein at least one of the cutting map, raking map, or gathering map includes GPS directional data.

10. The control system of claim 8, wherein:
the cutting data includes at least one of a field boundary, a swath position, a swath size, a swath cutting direction, an indication of an agricultural vehicle power, an indication of an agricultural vehicle speed, topographical data, or a time marker;
the raking data includes a raking direction or a stem direction; and
the gathering data includes a plurality of actual bale locations corresponding to a baling operation or a plurality of actual forage wagon exchange points corresponding to a foraging operation.

11. The control system of claim 8, wherein the proposed raking path includes GPS directional data indicating a shortest travel path based on a cutting direction.

12. The control system of claim 8, wherein the proposed gathering path includes GPS directional data indicating a proposed bale location for a loading operation.

13. The control system of claim 8, wherein the proposed gathering path includes GPS directional data indicating a proposed forage wagon exchange point for a foraging operation.

14. The control system of claim 8, wherein the processing circuitry is further configured to:
store the cutting data, cutting map, proposed raking path, raking data, raking map, proposed gathering path, gathering data, and gathering map in a database; and
using the cutting data, cutting map, proposed raking path, raking data, raking map, proposed gathering path, gathering data, and gathering map, generate a proposed path for at least one of a successive cutting operation, a successive raking operation, a successive gathering operation, a successive loading operation, or a successive foraging operation.

15. A method for hay and forage workflow mapping for a vehicle, the method comprising:
receiving, by one or more processors, cutting data corresponding to a crop cutting operation;
generating, by the one or more processors, a cutting map from the cutting data;
generating, by the one or more processors, a proposed raking path for a crop raking operation based at least in part on the cutting map;
autonomously operating, by the one or more processors, the vehicle along proposed raking path;
receiving, by the one or more processors, raking data corresponding to the crop raking operation;
generating, by the one or more processors, a raking map based at least in part on the raking data;
determining, by the one or more processors, an average stem direction of a crop based at least in part on the raking data;
generating, by the one or more processors, a proposed gathering path for a crop gathering operation based at least in part on the raking map and the average stem direction of the crop such that a direction of travel of the proposed gathering path provides a stem-first gathering of the crop;
receiving, by the one or more processors, gathering data corresponding to the crop gathering operation; and
generating, by the one or more processors, a gathering map from the gathering data.

16. The method of claim 15, wherein:
the cutting data includes at least one of a field boundary, a swath position, a swath size, a swath cutting direction, an indication of an agricultural vehicle power, an indication of an agricultural vehicle speed, topographical data, or a time marker;
the raking data includes a raking direction or a stem direction; and
the gathering data includes a plurality of actual bale locations corresponding to a baling operation or a plurality of actual forage wagon exchange points corresponding to a foraging operation.

17. The method of claim 15, wherein the proposed raking path includes GPS directional data indicating a shortest travel path based on a cutting direction.

18. The method of claim 15, wherein the proposed gathering path includes GPS directional data indicating a proposed bale location for a loading operation.

19. The method of claim 15, wherein the proposed gathering path includes GPS directional data indicating a proposed forage wagon exchange point for a foraging operation.

20. The method of claim 15, further comprising:
storing, by the one or more processors, the cutting data, cutting map, proposed raking path, raking data, raking map, proposed gathering path, gathering data, and gathering map in a database; and
using, by the one or more processors, at least one of the cutting data, cutting map, proposed raking path, raking data, raking map, proposed gathering path, gathering data, or gathering map to generate a proposed path for at least one of a successive cutting operation, a successive raking operation, a successive gathering operation, a successive loading operation, or a successive foraging operation.

* * * * *